US012547101B2

(12) United States Patent
Oki et al.

(10) Patent No.: US 12,547,101 B2
(45) Date of Patent: Feb. 10, 2026

(54) IMAGE FORMING DEVICE TO NOTIFY OF GUIDING MESSAGE SHOWING GUIDANCE ON RECYCLING CARTRIDGE

(71) Applicant: BROTHER KOGYO KABUSHIKI KAISHA, Nagoya (JP)

(72) Inventors: Satoru Oki, Nagoya (JP); Tetsunori Mori, Kariya (JP); Taichiro Kimoto, Nagoya (JP); Sadaaki Miyazaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/680,301

(22) Filed: May 31, 2024

(65) Prior Publication Data

US 2024/0427263 A1 Dec. 26, 2024

(30) Foreign Application Priority Data

Jun. 26, 2023 (JP) ................................ 2023-104203

(51) Int. Cl.
*G03G 15/08* (2006.01)
*G03G 15/00* (2006.01)

(52) U.S. Cl.
CPC ..... *G03G 15/0894* (2013.01); *G03G 15/5016* (2013.01); *G03G 15/556* (2013.01)

(58) Field of Classification Search
CPC ............... G03G 15/556; G03G 15/553; G03G 2221/1823; G03G 15/0863; G03G 21/1889; G03G 15/0894; G03G 2215/00987
See application file for complete search history.

(56) References Cited

U.S. PATENT DOCUMENTS

| | | | | |
|---|---|---|---|---|
| 6,029,031 A * | 2/2000 | Yokomori | G03G 21/181 399/113 |
| 6,502,916 B1 | 1/2003 | Naka | |
| 6,969,136 B1 | 11/2005 | Matsumoto et al. | |
| 2005/0078969 A1* | 4/2005 | Kikuchi | G03G 21/1892 399/12 |

(Continued)

FOREIGN PATENT DOCUMENTS

| | | |
|---|---|---|
| JP | 2000-94715 A | 4/2000 |
| JP | 2002-6694 A | 1/2002 |

OTHER PUBLICATIONS

Extended European Search Report issued in European Patent Application No. 24179496.5, Nov. 4, 2024.

*Primary Examiner* — Jessica L Eley
(74) *Attorney, Agent, or Firm* — Merchant & Gould P.C.

(57) ABSTRACT

An image forming device includes an image forming unit, a notification device, and a controller. The image forming unit is configured to print an image on a sheet with colorant accommodated in a cartridge mounted on the image forming device. The notification device is configured to notify of information. The controller is configured to perform, at a prescribed time, a recycling potential determination process to determine whether the cartridge can be recycled. The controller is configured to perform, when the recycling potential determination process determines that the cartridge can be recycled, a guiding process to control the notification device to notify of a guiding message showing a guidance on recycling the cartridge.

14 Claims, 3 Drawing Sheets

(56) References Cited

U.S. PATENT DOCUMENTS

| | | | | |
|---|---|---|---|---|
| 2005/0105934 | A1* | 5/2005 | Maruyama | G03G 15/556 399/109 |
| 2006/0062583 | A1* | 3/2006 | Kikuchi | G03G 21/1889 399/24 |
| 2012/0219318 | A1* | 8/2012 | Yoshida | G03G 15/0874 399/262 |

* cited by examiner

IMAGE FORMING DEVICE TO NOTIFY OF GUIDING MESSAGE SHOWING GUIDANCE ON RECYCLING CARTRIDGE

REFERENCE TO RELATED APPLICATIONS

This application claims priority from Japanese Patent Application No. 2023-104203 filed on Jun. 26, 2023. The entire content of the priority application is incorporated herein by reference.

BACKGROUND ART

Conventionally, cartridges storing colorant have been detachably mounted in image forming devices. When a cartridge runs out of colorant, the used cartridge is sometimes recycled, i.e., refilled with colorant in order to be reused. When a cartridge is mounted in a device, the device determines whether that cartridge can be recycled. When the device determines that the cartridge can be recycled, such information is displayed on the display of the device.

SUMMARY

In recent years, improving the recycling rate of cartridges has become increasingly important. Consequently, there is a need to promote the recycling of cartridges more effectively.

In view of the foregoing, it is an object of the present disclosure to provide an image forming device and an image forming system that promote recycling of cartridges more effectively.

In order to attain the above and other object, the present disclosure provides an image forming device. The image forming device includes an image forming unit, a notification device, and a controller. The image forming unit is configured to print an image on a sheet with colorant accommodated in a cartridge mounted on the image forming device. The notification device is configured to notify of information. The controller is configured to perform: at a prescribed time, a recycling potential determination process to determine whether the cartridge can be recycled; and when the recycling potential determination process determines that the cartridge can be recycled, a guiding process to control the notification device to notify of a guiding message showing a guidance on recycling the cartridge.

According to another aspect, the disclosure provides an image forming system. The image forming system includes a terminal device, and an image forming device. The image forming device is configured to communicate with the terminal device. The image forming device includes an image forming unit, a notification device, and a controller. The image forming unit is configured to print an image on a sheet with colorant accommodated in a cartridge mounted on the image forming device. The notification device is configured to notify of information. The controller is configured to perform: at a prescribed time, a recycling potential determination process to determine whether the cartridge can be recycled; and when the recycling potential determination process determines that the cartridge can be recycled, a transmission process to transmit information indicating a result of the recycling potential determination process to the terminal device. When the terminal device receives the information from the image forming device, the terminal device is configured to notify of a guiding message showing a guidance on recycling the cartridge.

In the above structures, a determination as to whether the cartridge can be recycled is made at the prescribed time.

When the determination that the cartridge can be recycled is made, a notification of the recycling guiding message is issued for the user. In other words, the notification is made so that the user is effectively encouraged to recycle the cartridge. Therefore, unlike the conventional technology that merely displays a message indicating that a cartridge can be recycled, the image forming device can effectively promote recycling of the cartridge.

DESCRIPTION

First Embodiment

A printer 1 according to a first embodiment will be described below with reference to FIGS. 1 and 2. The printer 1 is a device that forms images on printing papers (printing sheets) by depositing ink on the papers (sheets). Ink cartridges 2 are mounted in the printer 1. Each ink cartridge 2 supplies the printer 1 with ink to be used for image formation. The ink cartridges 2 include ink cartridges 2Bk, 2C, 2M, and 2Y corresponding to respective colors of ink accommodated therein. That is, the ink cartridge 2Bk accommodates black ink; the ink cartridge 2C accommodates cyan ink; the ink cartridge 2M accommodates magenta ink; and the ink cartridge 2Y accommodates yellow ink. The ink is an example of colorant. The printer 1 is an example of an image forming device.

At least two types of ink can be used in this embodiment. The first type of ink corresponds to a genuine product whose components, formulation, and the like are regulated by the manufacturer of the printer 1. This ink is used in ink cartridges 2 included with a new printer 1 (hereinafter referred to as "bundled cartridges") or in replacement ink cartridges 2 provided by the manufacturer of the printer 1. The second type of ink is provided by a party other than the manufacturer of the printer 1 and is a non-genuine product that differs in components, formulation, and other properties from the first type of ink described above. This ink is used in replacement ink cartridges 2 provided by a party other than the manufacturer of the printer 1, for example.

Figure 1:
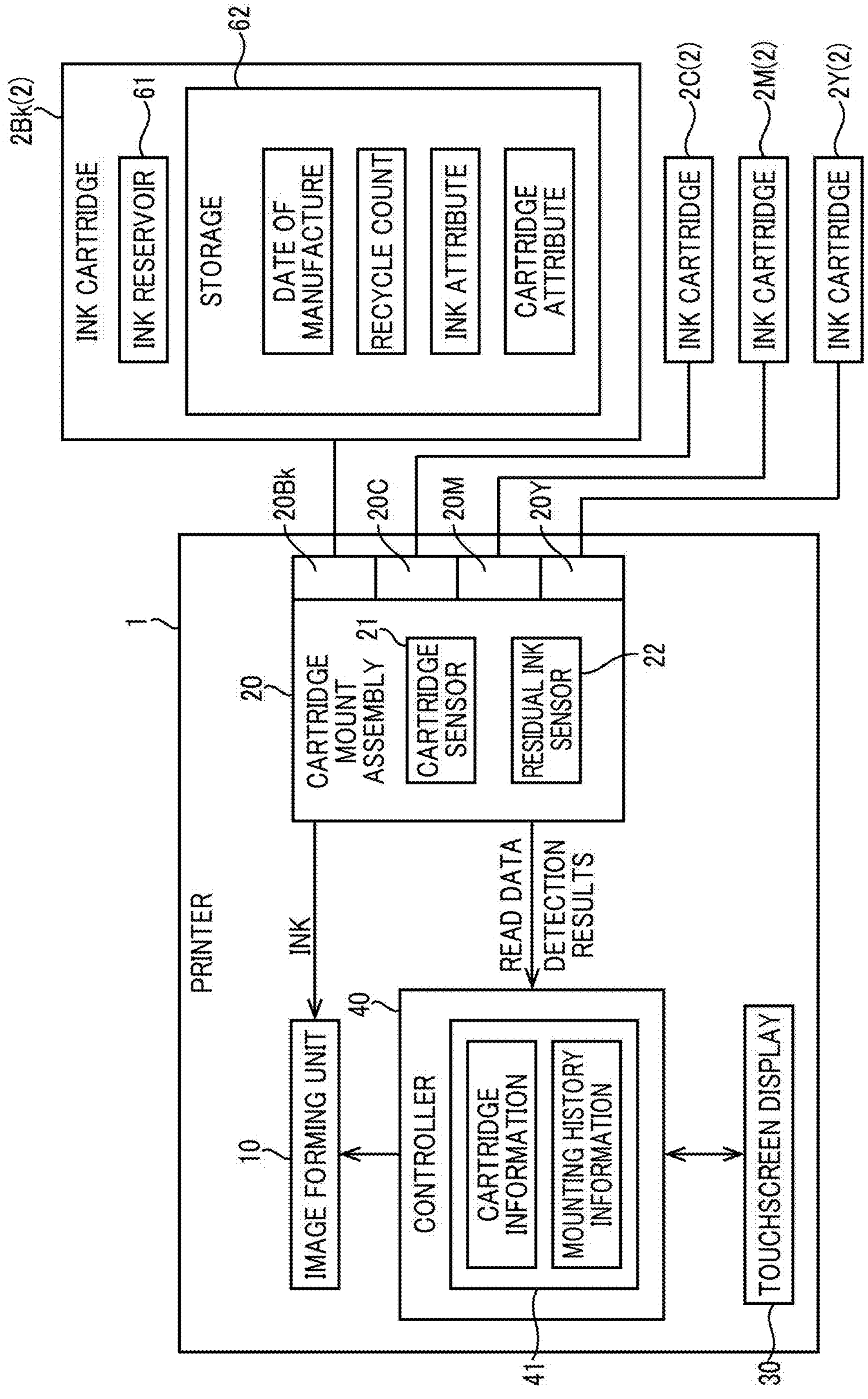
FIG. 1 is a block diagram illustrating a configuration of a printer.
Figure 2:
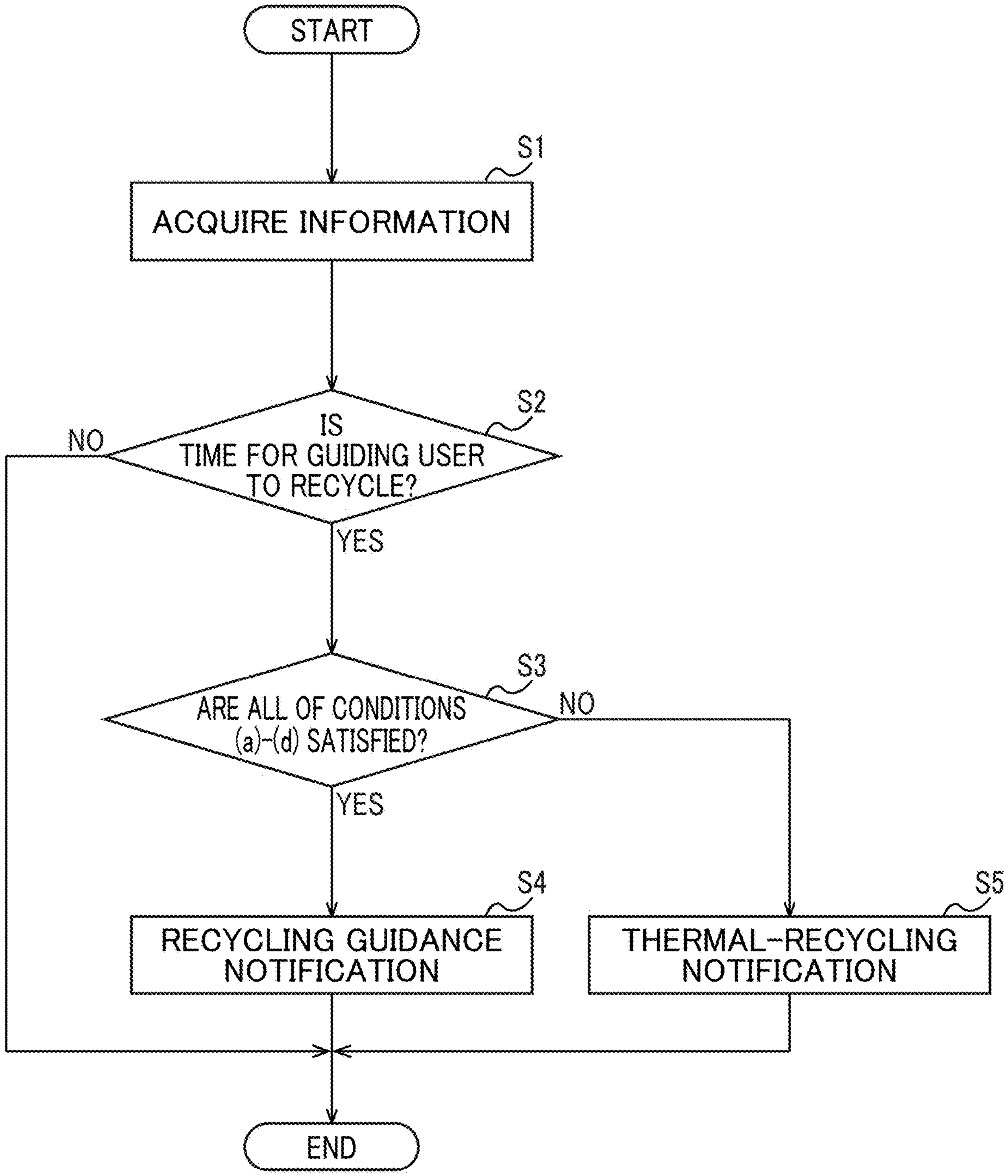
FIG. 2 is a flowchart illustrating a process performed by a CPU of the printer.

As shown in FIG. 1, each ink cartridge 2 has an ink reservoir 61 that stores ink, and a storage 62 configured of an IC chip. Ink in the ink reservoir 61 is supplied to the printer 1 in which the ink cartridge 2 is mounted.

The storage 62 stores data specifying the date of manufacture, a recycle count, an ink attribute, and a cartridge attribute. The date of manufacture specifies the year, month, and day that the ink cartridge 2 was manufactured. The recycle count specifies the number of times that the ink cartridge 2 was recycled, as will be described later. The storage 62 is an example of a cartridge storage. The date of manufacture is an example of a prescribed reference time. The ink attribute stored in the storage 62 is an example of attribute information. The cartridge attribute stored in the storage 62 is an example of attribute information.

The ink attribute corresponds to one or more properties of the ink stored in the ink reservoir 61. For example, the ink attribute may directly specify the properties of the ink stored in the ink reservoir 61, such as the composition, an ink color or type. Alternatively, the ink attribute may specify whether the ink cartridge 2 is a genuine product, for example. As described above, ink used in genuine products and ink used in non-genuine products differ in attribute such as components and formulation. Therefore, by specifying whether the ink is a genuine product, the ink attribute indirectly specify a certain property of the ink accommodated in the ink cartridge 2. In other words, the ink attribute includes or indicates one or more properties, and each property indicates one value of the ink attribute. For example, the value of the ink attribute as a property of the ink attribute specifies a value for one of the composition of the ink, the ink type, the ink color, and etc.

The cartridge attribute indicates whether the cartridge is a bundled cartridge (i.e., an initial cartridge mounted in the printer 1). The cartridge attribute is written to the storage 62 when the ink cartridge 2 is manufactured to be a bundled cartridge.

As shown in FIG. 1, the printer 1 has an image forming unit 10, a cartridge mount assembly 20, a touchscreen display 30, and a controller 40.

The image forming unit 10 houses printing papers (printing sheets). Under control of the controller 40, the image forming unit 10 performs image formation to form an image on a printing paper based on image data by depositing ink supplied from the ink cartridges 2 on the printing paper. The image forming unit 10 may be a print engine.

The cartridge mount assembly 20 is the unit in which the ink cartridges 2 are mounted. The cartridge mount assembly 20 has individual mount units (or mount members) 20Bk, 20C, 20M, and 20Y. The ink cartridges 2Bk, 2C, 2M, and 2Y are individually mounted in and removed from the corresponding individual mount units 20Bk, 20C, 20M, and 20Y. The cartridge mount assembly 20 has ink channels for supplying ink from mounted ink cartridges 2 to the image forming unit 10. The cartridge mount assembly 20 also has electrodes and wiring that electrically connect the storage units 62 of the mounted ink cartridges 2 to the controller 40.

The cartridge mount assembly 20 is provided with a cartridge sensor 21, and a residual ink sensor 22. The cartridge sensor 21 can detect when each of the ink cartridges 2 is mounted in, and can detect when each of the ink cartridges 2 is removed from the corresponding cartridge mount assembly 20. The residual ink sensor 22 can detect the residual quantity of ink accommodated in each ink cartridge 2. Both the cartridge sensor 21 and residual ink sensor 22 perform the above detections on each of the ink cartridges 2Bk, 2C, 2M, and 2Y. These sensors perform the above detections by detecting when detectable members block light emitted from emitting blocks, for example. The cartridge sensor 21 and residual ink sensor 22 transmit their detection results to the controller 40. The cartridge sensor 21 is an example of a cartridge sensor. The residual ink sensor 22 is an example of a residual colorant sensor.

The touchscreen display 30 displays text, images, and the like on a screen. When a finger or other object contacts the screen, the touchscreen display 30 detects the contact position and outputs the detection results to the controller 40. This enables the touchscreen display 30 to receive various user input.

The controller 40 is provided with hardware, such as a central processing unit (CPU), a read-only memory (ROM), a random-access memory (RAM), an application-specific integrated circuit (ASIC), and a current time holding circuit. The ROM stores various data including data for programs executed by the CPU and the ASIC. The ROM also stores data for a collection promoting message described later. The RAM stores image data acquired from external sources, and data used when the CPU executes programs.

The CPU and the ASIC, which are configured as hardware in the controller 40, execute various processes according to program data and other data, which are configured as software stored in the ROM, RAM, and the like of the controller 40. Through these processes, the controller 40 controls the image forming unit 10 to form images based on image data acquired from an external PC, for example. The controller 40 also has a storage 41 configured of memory and the like. When each ink cartridge 2 is mounted in the cartridge mount assembly 20, the controller 40 reads information indicating the stored content in the storage 62 and stores this information (hereinafter referred to as "cartridge information," as indicated in FIG. 1) in the storage 41. Thus, even when the ink cartridge 2 is subsequently removed from the cartridge mount assembly 20, the controller 40 can reference this cartridge information to determine the stored content in the storage 62 of the ink cartridge 2 that was removed from the cartridge mount assembly 20. The storage 41 is an example of a main storage.

The user continues to use each ink cartridge 2 until there is no more ink remaining in the ink reservoir 61. When the ink reservoir 61 runs out of ink, the user removes the ink cartridge 2 from the printer 1 and replaces the spent ink cartridge 2 with a new ink cartridge 2. After an ink cartridge 2 has been removed from the printer 1, the user may send the used ink cartridge 2 to a recycling facility. At the recycling facility, the ink cartridge 2 undergoes any needed recycling processes, and the stored content in the storage 62, such as the recycle count and the cartridge attribute, is updated. Specifically, an ink cartridge 2 collected at the factory is refilled with ink, and the recycle count in the storage 62 is incremented by 1. When the ink cartridge 2 being recycled corresponds to a bundled cartridge, the cartridge attribute recorded in the storage 62 are erased. Ink cartridges 2 recycled at the recycling facility are then remounted in the printer 1 to be reused. In this description, the term "recycle" or "recycling" used for ink cartridges 2 may indicate reusing the ink cartridge 2 in the printer 1 by remanufacturing the ink cartridge 2 for example. Here, the remanufacturing indicates a process including collecting the used ink cartridge 2 and refilling the ink cartridge 2 with ink so as to reuse the ink cartridge 2 in the printer 1. The term "recycle" or "recycling" is distinguished from the term "thermal-recycling" because the ink cartridge 2 is not reused in the printer 1 when the ink cartridge 2 is thermally recycled.

In recent years, there has been increasing demand to effectively promote the recycling of cartridges from the perspective of environmental sustainability. Therefore, the following method is employed in the present embodiment for encouraging users to recycle ink cartridges 2 at an appropriate time.

The controller 40 executes a recycling potential determination process to determine whether an ink cartridge 2 can be recycled. Four conditions (a), (b), (c), and (d) are used to determine recycling potential in the present embodiment. The conditions (a)-(d) are applied when determining recycling potential for each of the ink cartridges 2Bk, 2C, 2M, and 2Y.

The condition (a) is that the time elapsed since the date of manufacture does not exceed a prescribed length. As the elapsed time since the date of manufacture becomes longer, the deterioration of ink in the ink cartridge 2 progresses. In a conceivable case that an ink cartridge 2 storing deteriorated ink were recycled, the deteriorated ink remaining in the ink cartridge 2 mixes with ink used to refill the ink cartridge 2 and, thus, it may not be possible to guarantee the quality of the recycled ink cartridge 2. For a purpose to address such a problem, the controller 40 acquires the elapsed time since the date of manufacture specified in the content stored in the storage 62 of the ink cartridge 2 on the basis of the current time held by the current time holding circuit. By determining whether the elapsed time exceeds the prescribed length, the controller 40 can determine whether the condition (a) is satisfied.

The condition (b) is that the recycle count does not exceed a prescribed value. When a cartridge is repeatedly recycled, parts involved in the operations of the ink cartridge 2 become worn or deformed, which may cause the ink cartridge 2 to malfunction. For a purpose to address such a problem, the controller 40 determines whether the recycle count indicated by the content stored in the storage 62 exceeds the prescribed value, thereby determining whether condition (b) is satisfied.

The condition (c) pertains to the properties of the ink stored in the ink reservoir 61. Some ink accommodated in ink cartridges 2 may not have properties suitable for recycling. In a conceivable case that an ink cartridge 2 is replaced while the ink cartridge 2 being replaced uses ink having different properties than the ink in the replacement cartridge, inks with different properties could become mixed and adversely affect the recycling process.

For the condition (c), the controller 40 acquires the ink attribute specified by the content stored in the storage 62 and determines whether the property of the ink (ink property) indicated in the ink attribute is a specific property. The controller 40 determines that the condition (c) is not satisfied when the ink property is the first specific property (an example of a first property) and that the condition (c) is satisfied when the ink property is a second specific property different from the first specific property (an example of a second property). For example, the controller 40 determines that condition (c) is satisfied when the ink attribute indicates, as an ink property, a genuine product and determines that condition (c) is not satisfied when the ink attribute indicates, as an ink property, a non-genuine product. In a case that the ink attribute includes (or indicates) the plurality of properties, the controller 40 may determine that the condition (c) is satisfied when each of a plurality of ink properties are a respective one of a plurality of second specific properties. The plurality of ink properties may be properties for a composition of the ink, an ink type, and a color of the ink, for example. In this case, the controller 40 may determine that the condition (c) is not satisfied when at least one of the plurality of ink properties is a respective one of the plurality of first specific properties. When determining that condition (c) is not satisfied, the controller 40 stores mounting history information in the storage 41 that specifies these determination results. The storage 41 stores the mounting history information in association with information identifying the individual mount unit(s) in which the ink cartridge 2 in question was mounted as a specific mount unit. That is, the specific mount unit is a unit in which an ink cartridge which cannot be recycled has been mounted.

The condition (d) pertains to whether the controller 40 determined in the past that condition (c) was not satisfied. That is, once an ink cartridge 2 accommodating ink having a first specific property is mounted in an individual mount unit, ink with the first specific property will remain in the ink channel of that specific mount unit. Consequently, such residual ink could flow backward into a different ink cartridge subsequently mounted in the same specific mount unit and may still reside in the ink reservoir 61 of the different ink cartridge 2 when the ink cartridge 2 is collected for recycling. If such an ink cartridge 2 were recycled, the ink used to refill the ink reservoir 61 would mix with the ink having the first specific property and may become contaminated. For addressing such a problem, the controller 40 identifies the specific mount unit on the basis of the content stored in the storage 41. The controller 40 then determines that condition (d) is not satisfied for any ink cartridge 2 that has been mounted in this specific mount unit.

When an ink cartridge 2 among the ink cartridges 2Bk, 2C, 2M, and 2Y satisfies all four of the above conditions (a)-(d), the controller 40 determines that the ink cartridge 2 can be recycled. However, when the ink cartridge 2 does not satisfy any one of these four conditions, the controller 40 determines that the ink cartridge 2 cannot be recycled.

Alternatively, when an ink cartridge 2 among the ink cartridges 2Bk, 2C, 2M, and 2Y satisfies any combination of the above conditions (a)-(d), the controller 40 determines that the ink cartridge 2 can be recycled. In other words, the controller 10 may perform the recycling potential determination process on the basis of at least one of a recycle count, the attribute information, and an elapsed time from a reference time. The recycle count may be stored in the cartridge storage 62 provided in the cartridge 2. The recycle count may indicates the number of times that the cartridge 2 has been recycled. The reference time may be stored in the cartridge storage 62 provided in the cartridge 2. The attribute information may be stored in the cartridge storage 62 provided in the cartridge 2. The attribute information may be related to an attribute of the colorant accommodated in the cartridge 2.

For example, the controller 10 may perform the recycling potential determination process on the basis of at least a recycle count stored in a cartridge storage provided in the cartridge. The controller 10 may perform the recycling potential determination process on the basis of at least the elapsed time from the reference time. The controller may perform the recycling potential determination process on the basis of at least attribute information stored in a cartridge storage provided in the cartridge. The controller 10 may perform the recycling potential determination process on the basis of at least both the recycle count and the elapsed time from the reference time. The controller 10 may be configured to further perform a first determination process to determine whether the attribute information stored in the cartridge storage of the cartridge indicates a first property or a second property different from the first property. The attribute information may be related to an attribute of the colorant accommodated in the cartridge. The first determination process may determine that the cartridge 2 cannot be recycled when the attribute information indicates the first property whereas the first determination process determining that the cartridge 2 can be recycled when the attribute information indicates the second property. The controller 10 may be configured to further perform a storing process when the first determination process determines that the cartridge cannot be recycled. The storing process may be to store, in the main storage 41, unrecyclable information in association with a mount unit in which the cartridge 2 is mounted among the plurality of mount units. The controller 10 may be configured to further perform a second determination process to determine whether the cartridge is mounted in a specific mount unit that is a mount unit associated with the unrecyclable information among the plurality of mount units. The second determination process may determine that the cartridge cannot be recycled when the cartridge is mounted in the specific mount unit whereas the second determination process determining that the cartridge 2 can be recycled when the cartridge 2 is mounted in a mount unit not associated with the unrecyclable information among the plurality of mount units. The recycling potential determination process may determine that the cartridge 2 can be recycled when a prescribed condition is satisfied. The prescribed condition may include at least a condition that the first determination process determines that the cartridge can be recycled and a condition that the second determination process determines that the cartridge can be recycled.

The determination process in which the condition (c) is not satisfied is an example of a first determination process. The process in which all the four conditions including the condition (d) are satisfied for an ink cartridge 2 mounted in a mount unit other than the specific mount unit is an example of a second determination process. The process in which the conditions (c) and (d) are satisfied is another example of a second determination process.

In other words, the controller 40 may perform a first determination process, a storing process, and a second determination process. The first determination process is to determine whether the attribute information stored in the cartridge storage 62 of the cartridge 2 indicates the first property or the second property. Here, the ink attribute is an example of the attribute information. The first determination process determines that the cartridge 2 cannot be recycled when the attribute information indicates the first property whereas the first determination process determines that the cartridge 2 can be recycled when the attribute information indicates the second property. The storing process is performed when the first determination process determines that the cartridge cannot be recycled. The storing process is to store, in the main storage 41, unrecyclable information in association with a mount unit in which the cartridge 2 is mounted among the plurality of mount units. The mounting history information is an example of unrecyclable information. Here, a mount unit associated with the unrecyclable information may indicate that the mount unit is a specific mount unit in which at least one cartridge, for which the first determination process has determined that recycling cannot be made, has been mounted. The unrecyclable information associated with a mount unit may indicate that a cartridge to be mounted in the mount unit cannot be recycled. The second determination process is to determine whether the cartridge 2 is mounted in a specific mount unit that is a mount unit associated with the unrecyclable information among the plurality of mount units. The second determination process determines that the cartridge cannot be recycled when the cartridge is mounted in the specific mount unit whereas the second determination process determines that the cartridge can be recycled when the cartridge is mounted in a mount unit not associated with the unrecyclable information. The recycling potential determination process determines that the cartridge 2 can be recycled when a prescribed condition is satisfied. The prescribed condition includes at least a condition that the first determination process determines that the cartridge 2 can be recycled and a condition that the second determination process determines that the cartridge can be recycled.

Alternatively, the first determination process may determine whether the attribute information stored in a cartridge storage of each cartridge 2 of the plurality of cartridges 2 mounted in a corresponding one of the plurality of mount units indicates a first property or a second property different from the first property. In this case, the first determination process determines that the each cartridge 2 cannot be recycled when the attribute information indicates the first property whereas the first determination process determining that the each cartridge 2 can be recycled when the attribute information indicates the second property. The storing process is performed when the first determination process determines that the each cartridge 2 cannot be recycled. The storing process is to store, in the main storage 41, unrecyclable information in association with the mount unit in which the each cartridge 2 is mounted among the plurality of mount units. The second determination process is to determine whether the each cartridge 2 is mounted in a specific mount unit that is a mount unit associated with the unrecyclable information among the plurality of mount units 2. The second determination process determines that the each cartridge 2 cannot be recycled when the each cartridge 2 is mounted in the specific mount unit whereas the second determination process determines that the each cartridge 2 can be recycled when the each cartridge 2 is mounted in a mount unit not associated with the unrecyclable information among the plurality of mount units 2. The recycling potential determination process determines that the each cartridge can be recycled when a prescribed condition is satisfied. The prescribed condition including at least a condition that the first determination process determines that the each cartridge can be recycled and a condition that the second determination process determines that the each cartridge can be recycled.

After completing the process to determine recycling potential, the controller 40 displays an instruction message for recycling (hereinafter referred to as "recycling guiding message") on the touchscreen display 30. The recycling guiding message has content for guiding the user in recycling an ink cartridge 2 determined to have recycling potential. For example, the recycling guiding message specifies how the cartridge is to be collected. That is, the recycling guiding message may include a message indicating a method to allow the cartridge to be collected. Specifically, the recycling guiding message includes information instructing the user to place the ink cartridge 2 in a collection bag that came packaged with the ink cartridge 2 and to ship the ink cartridge 2 in this collection bag. The message also specifies a shipping address, the names and locations of stores that accept such collections, contact information, and the like. The recycling guiding message may be for showing a guidance on recycling the cartridge. The recycling guiding message may be for showing a guidance on recycling the cartridge so that the cartridge can be reused in the image forming device.

As another example, the recycling guiding message may be a message confirming whether the printer 1 may arrange (prepare) for the collection of the ink cartridge 2, such as a message asking the user whether the printer I may begin making arrangements for recycling the ink cartridge 2. That is, the recycling guiding message may include a message confirming whether to allow the cartridge to be collected. After displaying this message, the controller 40 accepts user input via the touchscreen display 30 indicating whether to permit such arrangements for collection. When the controller 40 receives user input indicating permission, the controller 40 transmits an instruction to an external server via the Internet, for example, to arrange to have the ink cartridge 2 recycled for the user. Upon receiving this instruction, the external server executes a process to arrange for a collection bag to be shipped to the user together with instructions on how the ink cartridge 2 is to be collected. The instructions may be an instruction sheet explaining how the ink cartridge 2 is to be collected, for example.

The content of the recycling guiding message varies according to the type of the ink cartridge 2. For example, suppose that the package for a bundled cartridge does not include a collection bag, whereas the package for a replacement cartridge (i.e., a non-bundled cartridge) does include a collection bag. In this case, when the ink cartridge 2 is determined to be a bundled cartridge on the basis of the cartridge attribute stored in the storage 62 of the ink cartridge 2, the recycling guiding message used by the controller 40 may specify a shipping address, the names and locations of stores that collect cartridges for recycling, contact information, and the like. On the other hand, when the ink cartridge 2 is determined not to be a bundled cartridge (i.e., is determined to be a replacement cartridge) for which cartridge attribute has not been written to the storage 62, the recycling guiding message used by the controller 40 may indicate that the user should use the collection bag that came packaged with the ink cartridge 2 to ship the cartridge.

Next, steps in a process performed by the controller 40 will be described with reference to FIG. 2. The process in FIG. 2 is periodically executed for each of the ink cartridges 2Bk, 2C, 2M, and 2Y. In S1 at the beginning of the process, the controller 40 acquires information for performing various determinations. The information acquired in S1 includes detection results of the cartridge sensor 21 and residual ink sensor 22, and content stored in the storage 62 of the ink cartridge 2.

In S2 the controller 40 determines whether the time for guiding the user to recycle an ink cartridge 2 has arrived. The controller 40 makes this determination on the basis of the detection results by the cartridge sensor 21 and residual ink sensor 22 among the information acquired in S1. Recycling guidance is performed in the present embodiment when an ink cartridge 2 is removed from the cartridge mount assembly 20. Recycling guidance is also performed when the residual quantity of ink in an ink cartridge 2 is less than or equal to a prescribed threshold value. The prescribed threshold value may correspond to a state in which the ink cartridge 2 is almost completely out of ink or may correspond to a state in which the ink cartridge 2 contains some residual ink but the amount is considerably diminished. The controller 40 determines whether the ink cartridge 2 is removed from the cartridge mount assembly 20 on the basis of a detection result from the cartridge sensor 21. The controller 40 ascertains the residual quantity of ink in the ink cartridge 2 on the basis of a detection result from the residual ink sensor 22.

When the controller 40 determines that it is not time to provide recycling guidance (S2: NO), the controller 40 ends the process of FIG. 2. However, when the controller 40 determines that it is time to provide recycling guidance (S2: YES), in S3 the controller 40 determines whether the ink cartridge 2 can be recycled on the basis of the information obtained in S1. As described above, the controller 40 determines that the ink cartridge 2 can be recycled when all of the conditions (a)-(d) are satisfied and determines that the ink cartridge 2 cannot be recycled when any one of the conditions (a)-(d) is not satisfied.

When the controller 40 determines that the ink cartridge 2 can be recycled (S3: YES), in S4 the controller 40 issues a recycling guidance notification. The recycling guidance notification is issued by displaying the recycling guiding message described above on the touchscreen display 30. Subsequently, the controller 40 ends the process in FIG. 2. The process of S4 is an example of a recycling guiding notification process.

When the controller 40 determines that the ink cartridge 2 cannot be recycled (S3: NO), in S5 the controller 40 issues a thermal-recycling notification. For the thermal-recycling notification, the controller 40 displays an instruction message for thermal recycling (hereinafter referred to as "different-recycling guiding message") on the touchscreen display 30. The different-recycling guiding message has content for guiding the user in providing the ink cartridge 2 for thermal recycling rather than recycling to reuse the cartridge 2. For example, the different-recycling guiding message includes information required to have the ink cartridge 2 thermally recycled. Specifically, such information includes information on how to arrange for a collection bag used for thermal-recycling (information such as the URL of a website for making such arrangements), the names and locations of stores that accept cartridges for thermal recycling, contact information, and the like. Subsequently, the controller 40 ends the process in FIG. 2. The process of S5 is an example of a second guiding process. The second guiding process is to control a notification device to notify of a second guiding message showing a guidance on a process different from a process to recycle the cartridge 2 to be reused in the printer 1. Here, the touchscreen display 30 is an example of a notification device. The thermal recycling is an example of a different process. The thermal recycling may be to heat the cartridge 2. The thermal recycling may be to heat the cartridge 2 so that the cartridge 2 can be reused. The thermal recycling may be to heat the cartridge 2 so that the cartridge 2 cannot be reused in the printer 1. In other words, the thermal recycling may be to heat the cartridge 2 so that the cartridge 2 can be reused not for the printer 1. The thermal recycling may be to heat the cartridge 2 to produce raw material from the cartridge 2. The thermal recycling may be a process to generate electricity or energy by heating the cartridge 2.

According to the embodiment described above, the controller 40 determines recycling potential of ink cartridges 2 at prescribed timings and notifies the user upon determining that an ink cartridge 2 can be recycled by displaying recycling guiding message on the touchscreen display 30. In other words, the controller 40 actively prompts the user with a notification for guiding the user in the recycling process so that the user is effectively encouraged to recycle the ink cartridge 2. Therefore, unlike the conventional technology that merely displays a message indicating that a cartridge can be recycled, the printer I can effectively promote recycling of the ink cartridge 2.

According to the above embodiment, the prescribed time for determining the recycling potential of a cartridge is the time at which the cartridge sensor 21 detects the removal of an ink cartridge 2 or the time at which the residual ink sensor 22 detects the residual quantity of ink in an ink cartridge 2 falling below a prescribed amount. At these timings, the possibility of the cartridge needing to be replaced is high. Therefore, the printer 1 issues the recycling guiding message at appropriate timings that are more likely to lead to the recycling of ink cartridges.

Second Embodiment

Figure 3:
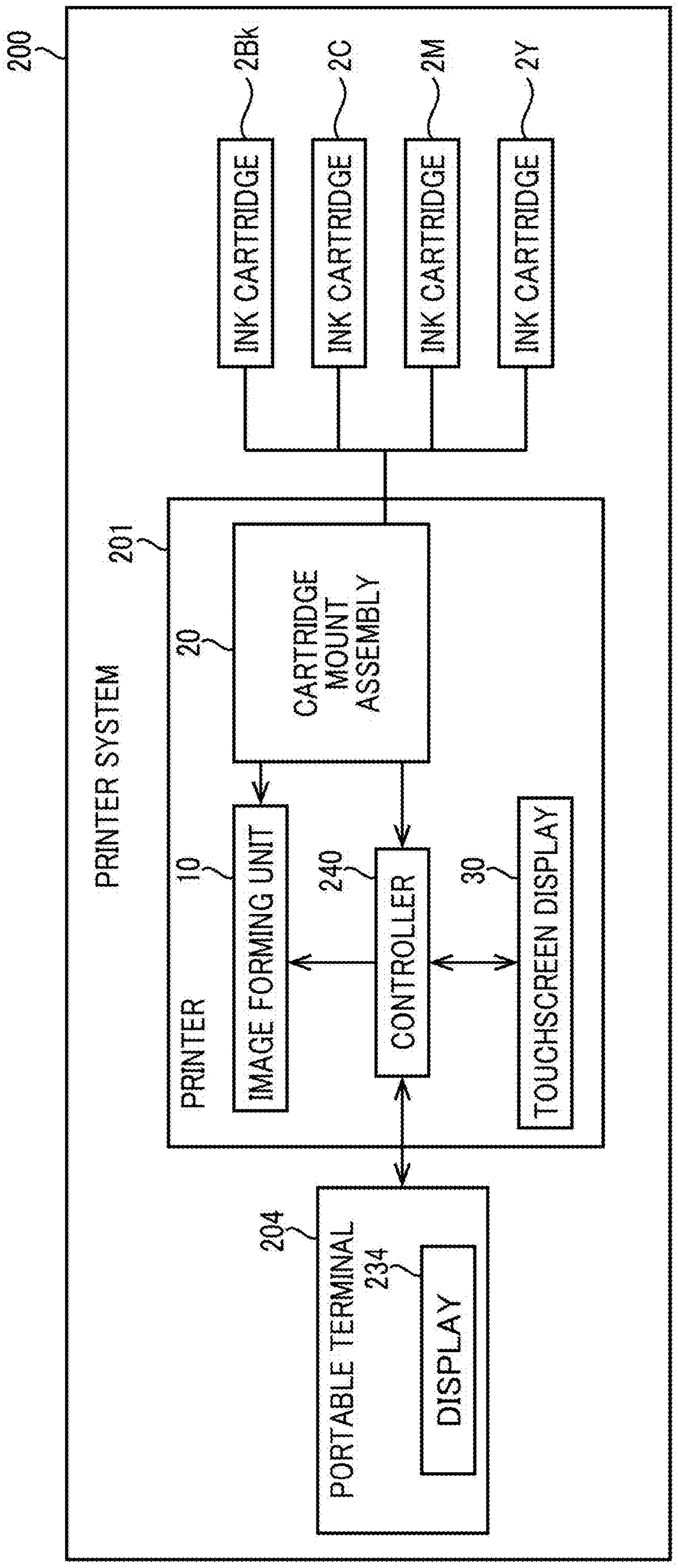
FIG. 3 is a block diagram illustrating a configuration of a printer system.

Next, a second embodiment of the present invention will be described with reference to FIG. 3. FIG. 3 shows a printer system 200 according to the second embodiment. The second embodiment differs from the first embodiment in that the printer system 200 uses a printer 201 in place of the printer 1 and includes a portable terminal 204. The portable terminal 204 and the printer 201 can communicate with each other via various types of short-range wireless communications. The portable terminal 204 is provided with hardware including a CPU, ROM, RAM, and a display 234; and software including program data and the like stored in the ROM and RAM. The functions of the portable terminal 204 are achieved through cooperative operations of the hardware and software.

Unlike the printer 1 in the first embodiment, the printer 201 uses a controller 240 in place of the controller 40. In addition to the functions of the controller 40 described above, the controller 240 performs a process to transmit the recycling guiding message or the different-recycling guiding message to the portable terminal 204. The portable terminal 204 displays the recycling guiding message or the different-recycling guiding message received from the printer 201 on the display 234. As a result, these messages are displayed not only on the touchscreen display 30 of the printer 201, but also on the display 234 of the portable terminal 204. The messages may also be displayed just on the display 234 and not on the touchscreen display 30.

In other words, when the recycling potential determination process determines that the cartridge 2 can be recycled, the controller 240 performs a transmission process to transmit information indicating a result of the recycling potential determination process to a terminal device. Here, the portable terminal 204 is an example of the terminal device. When the terminal device receives the information from the image forming device, the terminal device notifies of a guiding message showing a guidance on recycling the cartridge 2.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

In the above embodiments, the user is notified to recycle or recycle cartridges through recycling guiding message or different-recycling guiding message displayed on the touchscreen display 30 or the display 234. Instead of or in addition to displaying these messages, the user may receive these notifications in the form of audio outputted from speakers or messages printed on paper.

In the above embodiments, the controller 40 or 240 determines whether the ink cartridge 2 is a bundled cartridge based on stored content in the storage 62. As an alternative, the bundled cartridges and replacement cartridges may have different shapes. In this case, an optical sensor may be provided in the cartridge mount assembly 20 to detect such differences in shape.

In the above embodiments, condition (b) is used to determine whether an ink cartridge 2 can be recycled because parts in the ink cartridge 2 could fail due to wear or deformation. Another reason for using condition (b) might be that refill ink is repeatedly mixed with residual ink when an ink cartridge 2 is recycled multiple times. Consequently, the quality of ink in the ink cartridge 2 after multiple refills cannot be guaranteed.

Additionally, the above embodiments describe cases in which the present invention is applied to a printer 1 or 201, but the present invention is not limited to these applications. The present invention may be applied to other inkjet-type image forming devices that eject ink from heads, such as multifunction peripherals, copy machines, or systems including these image forming devices. The invention may also be applied to laser-type image forming devices that perform image recording processes by depositing toner on printing paper rather than depositing ink on printing paper as in the inkjet method. In this case, toner cartridges accommodating toner are detachably mounted in the image forming device.

What is claimed is:

1. An image forming device comprising:

an image forming unit configured to print an image on a sheet with colorant accommodated in a cartridge mounted on the image forming device;

a notification device configured to notify of information;

a plurality of mount units in which a plurality of cartridges is configured to be mounted;

a main storage; and a controller configured to perform:

at a prescribed time, a recycling potential determination process to determine whether the cartridge can be recycled; and when the recycling potential determination process determines that the cartridge can be recycled, a guiding process to control the notification device to notify of a guiding message showing a guidance on recycling the cartridge, wherein the controller is configured to perform the recycling potential determination process on the basis of at least attribute information stored in a cartridge storage provided in the cartridge, the attribute information being related to an attribute of the colorant accommodated in the cartridge, wherein the attribute information indicates selected at least one of a first property and a second property different from the first property, wherein the controller is configured to further perform:

a first determination process to determine whether the attribute information stored in the cartridge storage of the cartridge indicates the first property or the second property, the first determination process determining that the cartridge cannot be recycled when the attribute information indicates the first property whereas the first determination process determining that the cartridge can be recycled when the attribute information indicates the second property;

a storing process when the first determination process determines that the cartridge cannot be recycled, the storing process being to store, in the main storage, unrecyclable information in association with a mount unit in which the cartridge is mounted among the plurality of mount units; and a second determination process to determine whether the cartridge is mounted in a specific mount unit that is a mount unit associated with the unrecyclable information among the plurality of mount units, the second determination process determining that the cartridge cannot be recycled when the cartridge is mounted in the specific mount unit whereas the second determination process determining that the cartridge can be recycled when the cartridge is mounted in a mount unit not associated with the unrecyclable information among the plurality of mount units, wherein the recycling potential determination process determines that the cartridge can be recycled when a prescribed condition is satisfied, the prescribed condition including at least a condition that the first determination process determines that the cartridge can be recycled and a condition that the second determination process determines that the cartridge can be recycled.

2. The image forming device according to claim 1, wherein the guiding message includes one of a message showing a method to allow the cartridge to be collected and a message confirming whether to allow the cartridge to be collected.

3. The image forming device according to claim 1, wherein the controller performs the recycling potential determination process on the basis of at least a recycle count, the recycle count being stored in the cartridge storage provided in the cartridge, the recycle count indicating the number of times that the cartridge has been recycled.

4. The image forming device according to claim 1, wherein the controller performs the recycling potential determination process on the basis of at least an elapsed time from a reference time, the reference time being stored in the cartridge storage provided in the cartridge.

5. The image forming device according to claim 1, wherein the controller performs the recycling potential determination process on the basis of at least a recycle count and an elapsed time from a reference time, the recycle count being stored in the cartridge storage provided in the cartridge, the recycle count indicating the number of times that the cartridge has been recycled, the reference time being stored in the cartridge storage provided in the cartridge.

6. The image forming device according to claim 1, wherein the controller is configured to perform the first determination process, the storing process, the second determination process, and the recycling potential determination process on each cartridge of the plurality of cartridges mounted in a corresponding mount unit of the plurality of mount units.

7. The image forming device according to claim 1, wherein the guiding message shows the guidance on recycling so that the cartridge can be reused in the image forming device, wherein the controller is configured to further perform:

when the recycling potential determination process determines that the cartridge cannot be recycled, a second guiding process to control the notification device to notify of a second guiding message showing a guidance on a different process different from a process to recycle the cartridge to be reused in the image forming device.

8. The image forming device according to claim 7, wherein the different process includes a thermal recycling process to heat the cartridge.

9. The image forming device according to claim 1, further comprising:

a residual quantity sensor configured to detect a residual quantity of the colorant accommodated in the cartridge, wherein the prescribed time is based on the residual quantity detected by the residual quantity sensor.

10. The image forming device according to claim 9, wherein the prescribed time is a time when the residual quantity detected by the residual quantity sensor is less than or equal to a prescribed threshold value.

11. The image forming device according to claim 1, further comprising:

a cartridge sensor configured to detect removal of the cartridge from the image forming device, wherein the prescribed time is a time when the cartridge sensor detects removal of the cartridge from the image forming device.

12. The image forming device according to claim 1, wherein the guiding message varies according to cartridge attribute information stored in the cartridge storage provided in the cartridge, the cartridge attribute information being related to an attribute of the cartridge.

13. The image forming device according to claim 12, wherein the cartridge attribute information indicates whether the cartridge is an initial cartridge mounted in the image forming device.

14. An image forming system comprising:

a terminal device; and an image forming device configured to communicate with the terminal device, the image forming device comprising:

an image forming unit configured to print an image on a sheet with colorant accommodated in a cartridge mounted on the image forming device;

a notification device configured to notify of information;

a plurality of mount units in which a plurality of cartridges is configured to be mounted;

a main storage; and a controller configured to perform:

at a prescribed time, a recycling potential determination process to determine whether the cartridge can be recycled; and when the recycling potential determination process determines that the cartridge can be recycled, a transmission process to transmit information indicating a result of the recycling potential determination process to the terminal device, wherein when the terminal device receives the information from the image forming device, the terminal device is configured to notify of a guiding message showing a guidance on recycling the cartridge, wherein the controller is configured to perform the recycling potential determination process on the basis of at least attribute information stored in a cartridge storage provided in the cartridge, the attribute information being related to an attribute of the colorant accommodated in the cartridge, wherein the attribute information indicates selected at least one of a first property and a second property different from the first property, wherein the controller is configured to further perform:

a first determination process to determine whether the attribute information stored in the cartridge storage of the cartridge indicates the first property or the second property, the first determination process determining that the cartridge cannot be recycled when the attribute information indicates the first property whereas the first determination process determining that the cartridge can be recycled when the attribute information indicates the second property;

a storing process when the first determination process determines that the cartridge cannot be recycled, the storing process being to store, in the main storage, unrecyclable information in association with a mount unit in which the cartridge is mounted among the plurality of mount units; and a second determination process to determine whether the cartridge is mounted in a specific mount unit that is a mount unit associated with the unrecyclable information among the plurality of mount units, the second determination process determining that the cartridge cannot be recycled when the cartridge is mounted in the specific mount unit whereas the second determination process determining that the cartridge can be recycled when the cartridge is mounted in a mount unit not associated with the unrecyclable information among the plurality of mount units, wherein the recycling potential determination process determines that the cartridge can be recycled when a prescribed condition is satisfied, the prescribed condition including at least a condition that the first determination process determines that the cartridge can be recycled and a condition that the second determination process determines that the cartridge can be recycled.

* * * * *